United States Patent [19]

Hata et al.

[11] Patent Number: 5,294,670
[45] Date of Patent: Mar. 15, 1994

[54] POLYACETAL COPOLYMER AND COMPOSITION THEREOF

[75] Inventors: Tadashige Hata; Kazuhiko Matsuzaki, both of Kurashiki, Japan

[73] Assignee: Asahi Kasei Kogyo Kabushiki Kaisha, Osaka, Japan

[21] Appl. No.: 640,439
[22] PCT Filed: Jun. 8, 1990
[86] PCT No.: PCT/JP90/00748
  § 371 Date: Feb. 7, 1991
  § 102(e) Date: Feb. 7, 1991
[87] PCT Pub. No.: WO90/15088
  PCT Pub. Date: Dec. 13, 1990

[30] Foreign Application Priority Data

Jun. 8, 1989 [JP] Japan ................................. 1-144259
Jul. 6, 1989 [JP] Japan ................................. 1-172918
Oct. 31, 1989 [JP] Japan ................................. 1-281898
Nov. 24, 1989 [JP] Japan ................................. 1-303405
Dec. 8, 1989 [JP] Japan ................................. 1-317609

[51] Int. Cl.$^5$ ................................. C08F 8/28
[52] U.S. Cl. ................................. 525/154; 525/399; 525/400; 525/401; 525/427; 525/441; 525/456
[58] Field of Search ............... 525/154, 399, 441, 427, 525/456, 400, 401

[56] References Cited

U.S. PATENT DOCUMENTS 4,017,558 4/1977 Schmidt et al. ................... 525/91
4,535,127 8/1985 Matsuzaki et al. ................ 525/154

FOREIGN PATENT DOCUMENTS 50-119055 9/1975 Japan.
60-18511 1/1985 Japan.
60-40111 3/1985 Japan.

Primary Examiner—John Kight, III
Assistant Examiner—Richard Jones
Attorney, Agent, or Firm—Armstrong, Westerman, Hattori, McLeland & Naughton

[57] ABSTRACT

The present invention relates to a polyacetal copolymer comprising a polyoxymethylene group (A) and a vinyl polymer group (B), the copolymer having a structure of the formula (I):

$$A_n—X—B \qquad (I)$$

wherein X is a terminal group of B and represents a binding group derived from a compound having at least two carbon atoms and 1 to 4 groups selected from hydroxyl, carboxyl, ester, amino and alkoxy groups, and $A_n$ means that A is present in the quantity of n times in number, and bonds to X, in which n=1 to 4, and the copolymers has a number average molecular weight of 10,000 to 500,000; a process for the production of said copolymer; and a composition comprising said copolymer and a polyvinyl polymer and/or polyoxymethylene.

7 Claims, No Drawings

POLYACETAL COPOLYMER AND COMPOSITION THEREOF

FIELD OF THE INVENTION

The present invention relates to a polyacetal copolymer having excellent surface decorating performance. More specifically, the present invention relates to a polyacetal copolymer which permits direct coating and printing on a molded article made of the polyacetal copolymer without acid treatment or primer treatment of the molded article surface, and a composition thereof.

BACKGROUND OF THE INVENTION

Polyacetal resin is widely used in a variety of fields such as in the field of automobile parts, etc., because of its excellent mechanical strength, abrasion resistance, creep properties, fatigue properties and electrical properties.

In general, however, polyacetal resin has a problem in that surface decorating such as printing, coating, etc., is difficult due to its poor surface activity. Therefore, several attempts have been made to improve its surface decorating performance. For example, there has been proposed a method of preliminary treatment with acidic chemicals of phosphoric acid and sulfuric acid, a method of using a cellulose-based coating composition as a primer, a method of using a primer prepared by dissolving a chlorinated polyolefin resin in a chlorine-containing solvent, and some other methods have been proposed to improve surface decorating performance.

However, these methods are not fully satisfactory due to problems such as the requirement of additional processing steps for acid treatment and washing with water, deformation of the material due to a step of drying the coating, harmfulness of a chlorine-containing solvent, etc.

An object of this invention is to overcome the above problems associated with the prior methods such as the requirement of additional processing steps, deformation of the material, harmfulness of a chlorine-containing solvent, etc. That is, the present invention seeks to simplify a coating step and to reduce production costs so that a decorative article having a coating with high bond strength can be produced free from material deformation by only applying a coating composition directly to a polyacetal molded article surface without any chemical treatment or primer treatment and drying the coating.

An acetal polymer is usually produced by homopolymerization of formaldehyde or trioxane, or by copolymerization of formaldehyde or trioxane with a cyclic ether.

For example, U.S. Pat. No. 3,218,295 discloses the Polymerization of formaldehyde in the presence of a polyalkylene glycol or a vinyl compound such as a vinyloxyethylamine/methyl methacrylate copolymer or a vinyloxyethylamine/isobutyl methacrylate copolymer. U.S. Pat. No. 3,732,333 also discloses the polymerization of formaldehyde in the presence of a living polymer of a vinyl compound such as styrene or methyl methacrylate.

However, polymers obtained by the above polymerization processes can hardly give the surface decorating performance referred to in the present invention. Further, the mechanical properties inherently belonging to a polyacetal resin are degraded to a great extent.

The polymer of the above U.S. Pat. No. 3,732,333 also has a defect in that the polymer is a mixture of a vinyl polymer with an aldehyde homopolymer due to its polymerization process in which formaldehyde is polymerized in the presence of a living polymer as a polymerization initiator.

DISCLOSURE OF THE INVENTION

The present inventors have made a diligent study to overcome the above problems, and found that a novel polyacetal copolymer comprising a polyoxymethylene and a specific vinyl compound and a composition thereof give an excellent surface decorating performance to permit coating and printing without any preliminary treatment with a chemical or primer treatment, and this invention has been completed on the basis of this finding.

The first and second aspects of this invention are directed to the following:

a polyacetal copolymer which is a copolymer comprising a polyoxymethylene group (A) and a vinyl polymer group (B), having a structure of the formula (I):

$$A_n-X-B \quad (I)$$

wherein X is a terminal group of B and represents a binding group derived from a compound having at least two carbon atoms and 1 to 4 groups selected from hydroxyl, carboxyl, ester, amino and alkoxy groups, and $A_n$ means that A is present in the quantity of n times in number, and bonds to X, in which n=1 to 4, and the polyacetal copolymer has a number average molecular weight of 10,000 to 500,000; and a process for the production of the above polyacetal copolymer which comprises homopolymerizing formaldehyde or trioxane in the presence, as a molecular weight regulator, of a vinyl polymer having 1 to 4 groups selected from hydroxyl, carboxyl, amino, ester and alkoxy groups at one terminal thereof or copolymerizing formaldehyde or trioxane with a cyclic ether in the presence of the above molecular weight regulator.

A third aspect of this invention is directed to a polyacetal resin composition, comprising:

(a) a polyacetal copolymer having a structure of the above formula (I), (b) a polyvinyl polymer having a structure of the formula (III):

$$\begin{array}{c} R_1' \\ | \\ +CH_2-C\!\!+\!\!_z \\ | \\ R_2' \end{array} \quad (III)$$

wherein $R_1$, is hydrogen or alkyl, $R_2$, is hydrogen, phenyl, cyano, chloro, acetyl or alkyl ester, and z is 10 to 5,000, and (c) a polyoxymethylene;

the composition containing, per 100 parts by weight of the (a) polyacetal copolymer, 0 to 500 parts by weight of the (b) polyvinyl polymer and 0 to 1,700 parts by weight of the (c) polyoxymethylene, and containing (a) and at least one of (b) and (c).

PREFERRED EMBODIMENTS OF THE INVENTION

The polyacetal copolymer of this invention is a novel copolymer comprising a polyoxymethylene group (A) and a vinyl polymer group (B) and having a structure of the formula (I):

$$A_n\text{—}X\text{—}B \qquad (I)$$

wherein X is a terminal group of B and represents a binding group derived from a compound having at least two carbon atoms and 1 to 4 groups selected from hydroxyl, carboxyl, ester, amino and alkoxy groups, and $A_n$ means that A is present in the quantity of n times in number, and bonds to X in which n = 1 to 4. The polyoxymethylene group above encompasses a polyoxymethylene homopolymer and a polyoxymethylene copolymer.

The polyoxymethylene homopolymer above is a polymer having oxymethylene recurring units of $\text{-(CH}_2\text{O)-}$. The polyoxymethylene copolymer above is also a polymer having the following oxyalkylene units:

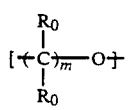

wherein each $R_0$ is independently hydrogen, alkyl or aryl, and m is 2 to 6. These oxyalkylene units are inserted into a chain of the oxymethylene units at random.

The content of the oxyalkylene units in the polyoxymethylene copolymer is 0.05 to 50 moles, preferably 0.1 to 20 moles per 100 moles of the oxymethylene units.

The polyacetal copolymer of this invention which has a hydroxyl group in the terminal portion of the polyoxymethylene chain immediately after the polymerization is unstable. When the polyoxymethylene group is a polyoxymethylene homopolymer, the terminal hydroxyl group is converted to a stable group by a known method such as esterification, etherification, urethanation, etc., before practical use of the polyacetal copolymer. When the polyoxymethylene group is a polyoxymethylene copolymer, the terminal group is treated in the same way as in the case of the polyoxymethylene homopolymer or the terminal unstable group is removed by hydrolysis before practical use.

The structure of the polyacetal copolymer of this invention is identified in the following manner. That is, when the polyacetal copolymer is hydrolyzed in an acidic aqueous solution, the oxymethylene recurring unit portion becomes formaldehyde, and the oxyalkylene unit portion inserted into the polyoxymethylene copolymer becomes an alkylene glycol of the following formula:

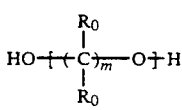

In addition, the vinyl polymer group becomes a vinyl polymer of the formula (IV):

$$X'\text{—}B \qquad (IV)$$

wherein X' represents 1 to 4 hydroxyl or carboxyl groups, since the bond between X and the polyoxymethylene group (A) in the formula (I) is broken.

The formaldehyde and the alkylene glycol are analyzed and determined by means of gas chromatography, liquid chromatography, or the like. The vinyl polymer of formula (IV) is also analyzed and determined by means of chromatography, IR, NMR, GPC, or the like.

The number average molecular weight of the polyacetal copolymer of this invention is the same as those of known high-molecular-weight polyacetals, and it is in the range of about 10,000 to 500,000. The lower limit of the number average molecular weight is limited by the properties of the polyacetal copolymer, and the upper limit thereof is limited by the molding processability of the polyacetal copolymer. The number average molecular weight of the polyacetal copolymer is determined in the following manner. That is, the number average molecular weight of 100,000 or less is determined by an osmotic pressure method or by an end-group analysis method, and the number average molecular weight of 100,000 or more is determined by relating a weight average molecular weight determined by a light-scattering method with an elution curve determined by a gel permeation chromatography (GPC).

The A segment of the polyacetal copolymer of this invention encompasses a polyoxymethylene homopolymer and a polyoxymethylene copolymer. In the polyoxymethylene copolymer, the oxyalkylene unit to be inserted into the polymer composed mainly of oxymethylene units is represented by the formula:

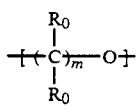

wherein each $R_0$ is independently hydrogen, alkyl or aryl, and m is 2 to 6. Examples of the oxyalkylene unit are an oxyethylene unit $\text{-((CH}_2\text{)}_2\text{O)-}$, an oxypropylene unit

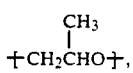

an oxytrimethylene unit $\text{-((CH}_2\text{)}_3\text{O)-}$, an oxytetramethylene unit $\text{-((CH}_2\text{)}_4\text{)-}$, an oxybutylene unit

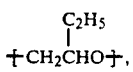

an oxyhexamethylene unit $\text{-((CH}_2\text{)}_6\text{O)-}$, and an oxyphenylethylene unit

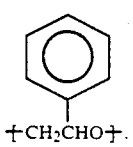

Of these oxyalkylene units, the oxyethylene unit and the oxytetramethylene unit are particularly preferred in view of improvement in physical properties of the polyacetal copolymer.

The polyoxymethylene group (A) as one segment of the polyacetal copolymer of this invention has a number average molecular weight of about 5,000 to about 495,000. The lower limit of the number average molecular weight is limited by physical properties of the polyacetal copolymer, and the upper limit thereof is limited by the molding processability of the polyacetal copolymer.

The vinyl polymer group (B) as another segment of the polyacetal copolymer of this invention is a compound having a structure of the formula (II):

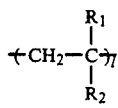

wherein $R_1$ is hydrogen or alkyl, $R_2$ is hydrogen, phenyl, cyano, chloro, acetyl, alkyl ester, and l is 10 to 5,000. Compounds having a structure of the formula (II) are classified into the following three groups.

Examples of the first group are a styrene polymer, an acrylonitrile polymer, a vinyl chloride polymer, an ethylene polymer, a vinyl acetate polymer, a styrene/acrylonitrile copolymer, a styrene/vinyl chloride copolymer, an ethylene/vinyl acetate copolymer, a styrene/ vinyl acetate copolymer, an acrylonitrile/vinyl acetate copolymer and a vinyl chloride/vinyl acetate copolymer.

Examples of the second group are a polymer of an acrylic or a methacrylic ester and a copolymer of an acrylic ester and a methacrylic ester.

Typical examples of the acrylic ester are methyl acrylate, ethyl acrylate, n-propyl acrylate, iso-propyl acrylate, n-butyl acrylate, iso-butyl acrylate, sec-butyl acrylate, tert-butyl acrylate, n-octyl acrylate, 2-ethylhexyl acrylate, n-lauryl acrylate, iso-lauryl acrylate, n-stearyl acrylate, iso-stearyl acrylate, acrylamide, dimethylaminoethyl acrylate glycidyl acrylate, and cyclohexyl acrylate. Typical examples of the methacrylic ester are methyl methacrylate, ethyl methacrylate, n-propyl methacrylate, iso-propyl methacrylate, n-butyl methacrylate, iso-butyl methacrylate, sec-butyl methacrylate, tert-butyl methacrylate, n-octyl methacrylate, 2-ethylhexyl methacrylate, n-lauryl methacrylate, iso-lauryl methacrylate, n-stearyl methacrylate, iso-stearyl methacrylate, dimethylaminoethyl methacrylate, glycidyl methacrylate, and cyclohexyl methacrylate.

Examples of the third group are copolymers of an acrylic or methacrylic ester with styrene, acrylonitrile, ethylene, vinyl acetate or vinyl chloride.

The vinyl polymer group has a number average molecular weight of about 1,000 to about 300,000, and those having a number average molecular weight of 1,000 to 100,000 are preferred in view of ease in production and purification.

In the polyacetal copolymer of this invention, the binding group (X) which binds the polyoxymethylene group (A) and the vinyl polymer group (B) is selected from a variety of hydrocarbon moieties which have at least 2 carbon atoms and 1 to 4 groups selected from hydroxyl, carboxyl, amino ester and alkoxy groups. A binding group having a structure of the following formula is preferred in view of ease in production:

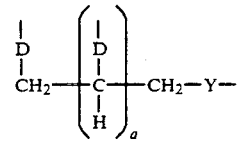

wherein each D is

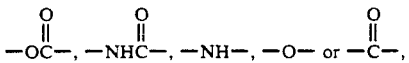

Y is oxygen or sulfur, a is 0 to 3, and B is a vinyl polymer group.

The polyacetal copolymer of this invention is specifically illustrated with structural formulae as follows:
(1) n = 1 in the formula (I):

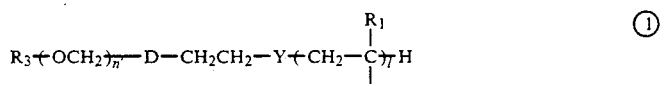

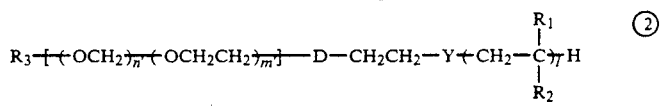

(2) n = 2 in the formula (I):

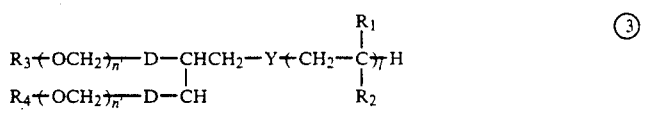

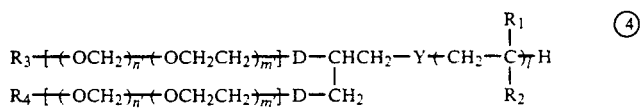

(3) n = 3 in the formula (I):

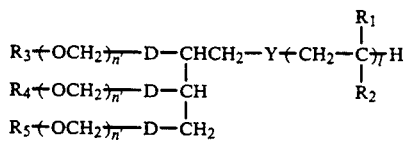
(5)

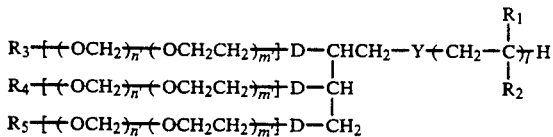
(6)

(4) n=4 in the formula (I):

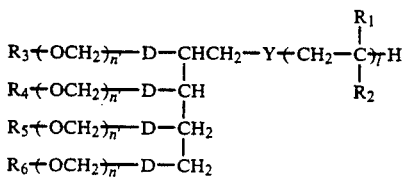
(7)

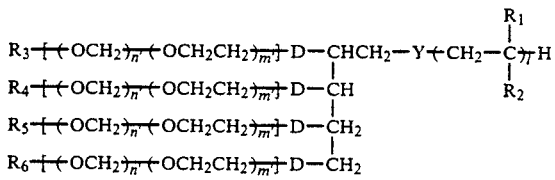
(8)

In the above structural formulae, $R_1$ is hydrogen or alkyl, $R_2$ is hydrogen, phenyl, cyano, chloro, acetyl or alkyl ester, l is 10 to 5,000, each of $R_3$ to $R_6$ is independently hydrogen, alkyl or acyl, each of n' and m' is an integer, each D is

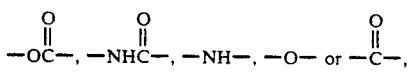

and Y is oxygen or sulfur.

In addition, the structural formula $\{+(OCH_2)_{n'}-(OCH_2CH_2)_{m'}\}$ means that m' mol of the oxyethylene units are inserted in n' mol of the oxymethylene units, and does not define the distribution of the oxymethylene units in the polymer chain.

The production of the polyacetal copolymer of this invention will be explained below.

The polyacetal copolymer of this invention is produced by homopolymerizing formaldehyde or trioxane in the presence, as a molecular weight regulator, of a vinyl polymer which has a structure of the formula (II):

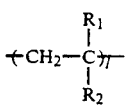
(II)

wherein $R_1$ is hydrogen or alkyl, $R_2$ is hydrogen, phenyl, cyano, chloro, alkyl ester, and l is 10 to 5,000, and which has 1 to 4 groups selected from hydroxyl, carboxyl, ester, amino and alkoxy groups at one terminal portion thereof or by copolymerizing formaldehyde or trioxane with a cyclic ether in the presence of the above molecular weight regulator.

Examples of the molecular weight regulator used in this invention are illustrated with structural formulae as follows:

(1) First group

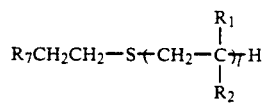
(9)

(2) Second group

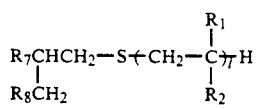
(10)

(3) Third group

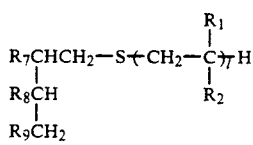
(11)

(4) Fourth group

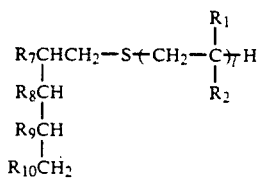
(12)

In the above formulae, each of $R_7$ to $R_{10}$ is independently hydroxyl, alkoxy, ester, carboxyl or amino.

It is desirable to purify the above molecular weight regulators by distillation, adsorption, drying, etc., in advance of the use for the polymerization. These molecular weight regulators may be used alone or in combination.

In the homopolymerization in this invention, fully purified formaldehyde or trioxane is used as a starting material. An anionic polymerization catalyst is mainly used for the homopolymerization of formaldehyde, and a cationic polymerization catalyst is used for the homopolymerization of trioxane.

In the copolymerization in this invention, fully purified formaldehyde or trioxane is used as a starting material, and these starting materials are copolymerized with a cyclic ether in the presence of a cationic polymerization catalyst.

Examples of a first group of the cyclic ether to be copolymerized with the above starting materials are alkylene oxides of the formula:

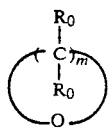

wherein each $R_0$ is independently hydrogen, alkyl or aryl, and m is 2 to 6, such as ethylene oxide, propylene oxide, butylene oxide, epichlorohydrin, styrene oxide, oxetane, 3,3-bis(chloromethyl)oxetane, tetrahydrofuran and oxepane. Of these alkylene oxides, ethylene oxide is particularly preferred.

Examples of a second group of the cyclic ether are cyclic formals of the following formula:

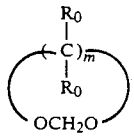

such as ethylene glycol formal, propylene glycol formal, diethylene glycol formal, triethylene glycol formal, 1,4-butanediol formal, 1,5-pentanediol formal, and 1,6-hexanediol formal. Of these cyclic formals, ethylene glycol formal, diethylene glycol formal and 1,4-butanediol formal are particularly preferred.

The amount of the cyclic ether per 100 parts by weight of the starting material is 0.03 to 100 parts by weight, preferably 0.1 to 50 parts by weight.

The anionic polymerization catalyst and the cationic polymerization catalyst for use in the homopolymerization and copolymerization in this invention are as follows.

Typical examples of the anionic polymerization catalyst are alkali metals such as sodium and potassium, alkali metal complex compounds such as sodium-naphthalene and potassium-anthracene, alkali metal hydrides such as sodium hydride, alkaline earth metal hydrides such as calcium hydride, alkali metal alkoxides such as sodium methoxide and potassium t-butoxide, alkali metal carboxylates such as sodium caproate and potassium stearate, alkaline earth metal carboxylates such as magnesium caproate and calcium stearate, amines such as n-butylamine, diethylamine, trioctylamine and pyridine, quaternary ammonium salts such as ammonium stearate, tetrabutylammonium methoxide and dimethyldistearylammonium acetate, phosphonium salts such as tetramethylphosphonium propionate and trimethylbenzylphosphonium ethoxide, tetravalent organic tin compounds such as tributyltin chloride, diethyltindilaurate and dibutyltin dimethoxide, and alkyl metals such as n-butyllithium and ethylmagnesium chloride.

Examples of the cationic polymerization catalyst are Friedel-Crafts type compounds such as tin tetrachloride, tin tetrabromide, titanium tetrachloride, aluminum trichloride, zinc chloride, vanadium trichloride, antimony pentafluoride, boron trifluoride and boron trifluoride coordination compounds e.g. boron trifluoride diethyl etherlate, boron trifluoride acetic anhydrate, boron trifluoride triethylamine complex compound; inorganic and organic acids such as perchlorate, acetyl perchlorate, hydroxyacetic acid, trichloroacetic acid and p-toluene sulfonate, complex salt compounds such as triethyloxonium tetrafluoroborate, triphenylmethyl hexafluoroantimonate, allyldiazonium hexafluorophosphate and allyldiazonium tetrafluoroborate, and alkyl metals such as diethylzinc, triethylaluminum and diethylaluminum chloride.

The amount of the above anionic polymerization catalyst and the cationic polymerization catalyst per 100 parts by weight of the starting material is 0.0005 to parts by weight. The homopolymerization or copolymerization is carried out in the absence of a solvent or in the presence of an organic solvent.

Examples of the organic solvent are aliphatic hydrocarbons such as n-pentane, n-hexane, n-heptane, n-octane, cyclohexane and cyclopentane, aromatic hydrocarbons such as benzene, toluene and xylene, halogenated aliphatic hydrocarbons such as methylene chloride, chloroform, carbon tetrachloride, ethylene chloride and trichloroethylene, and halogenated aromatic hydrocarbons such as chlorobenzene and o-dichlorobenzene. These organic solvents may be used alone or in combination. The molecular weight regulator is used by homogeneously dissolving or dispersing it in the reaction system. The concentration of the molecular weight regulator in the system can be easily determined by an experiment depending upon that molecular weight required for a desired polyacetal copolymer.

The reaction temperature is usually set at a temperature between $-20°$ C. and $230°$ C., and it is preferably set between $20°$ C. and $210°$ C. when no solvent is used, and between $-10°$ C. and $120°$ C. when an organic solvent is used.

The reaction time is not specially limited, and may be set for a period of time between 5 seconds and 300 minutes.

The homopolymerization or copolymerization is terminated by adding a short-stop to the reaction system after a predetermined period of time. The resultant polymer is stabilized by removing its unstable terminal portion by hydrolysis or by blocking the unstable terminal portion by an esterification method, etc. A stabilizer, etc., may be further added to the stabilized polyacetal copolymer as required before practical use.

The polyacetal copolymer of this invention provides for an excellent surface decorating performance even if used alone, and if also exhibits an excellent performance when used in combination with another component, as will be described below.

The composition of this invention will be explained below.

The polyacetal resin composition of the present invention comprises (a) a polyacetal copolymer of this invention, (b) a polyvinyl polymer having a structure of the formula (III):

wherein $R_1'$ is hydrogen or alkyl, $R_2'$ is hydrogen phenyl, cyano, chloro, acetyl or alkyl ester, and z is 10 to 5,000, and (c) a polyoxymethylene; the composition containing, per 100 parts by weight of the (a) polyacetal copolymer, 0 to 500 parts by weight of the (b) polyvinyl polymer and 0 to 1,700 parts by weight of the (c) polyoxymethylene, and containing (a) and at least one of (b) and (c).

The polyvinyl polymer having a structure of the formula (III) for use in the polyacetal resin composition of this invention is classified into three groups.

Examples of the first group are a styrene polymer, an acrylonitrile polymer, a vinyl chloride polymer, an ethylene polymer, a vinyl acetate polymer, a styrene/acrylonitrile copolymer, a styrene/vinyl chloride copolymer, an ethylene/vinyl acetate copolymer, a styrene/vinyl acetate copolymer, an acrylonitrile/vinyl acetate copolymer, a vinyl chloride/vinyl and acetate copolymer.

Examples of the second group are a polymer of an acrylic or methacrylic ester and a copolymer of an acrylic ester and a methacrylic ester.

Typical examples of the acrylic ester are methyl acrylate, ethyl acrylate, n-propyl acrylate, iso-propyl acrylate, n-butyl acrylate, iso-butyl acrylate, sec-butyl acrylate, tert-butyl acrylate, n-octyl acrylate, 2-ethylhexyl acrylate, n-lauryl acrylate, iso-lauryl acrylate, n-stearyl acrylate, iso-stearyl acrylate, 2-hydroxyethyl acrylate, acrylamide, dimethylaminoethyl acrylate, glycidyl acrylate, and cyclohexyl acrylate. Typical examples of the methacrylic ester are methyl methacrylate, ethyl methacrylate, n-propyl methacrylate, iso-propyl methacrylate, n-butyl methacrylate, iso-butyl methacrylate, sec-butyl methacrylate, tert-butyl methacrylate, n-octyl methacrylate, 2-ethylhexyl methacrylate, n-lauryl methacrylate, iso-lauryl methacrylate, n-stearyl methacrylate, iso-stearyl methacrylate, 2-hydroxyethyl methacrylate, 2-hydroxypropyl methacrylate, dimethylaminoethyl methacrylate, glycidyl methacrylate, and cyclohexyl methacrylate.

Examples of the third group are copolymers of an acrylic or methacrylic ester with styrene, acrylonitrile, ethylene, vinyl acetate or vinyl chloride.

The polyoxymethylene for use in the polyacetal resin composition of this invention is classified into two groups such as a homopolymer and a copolymer. The homopolymer in the first group is a polymer obtained by homopolymerization of formaldehyde or trioxane. The copolymer in the second group is a polymer obtained by copolymerization of formaldehyde or trioxane with a cyclic ether. Examples of the cyclic ether are alkylene oxides such as ethylene oxide, propylene oxide and butylene oxide and cyclic formals such as 1,4-butanediol formal, ethylene glycol cyclic formals such as 1,4-butanediol formal, ethylene glycol formal and diethylene glycol formal.

The amount of the polyvinyl polymer is required to be in the range of 0 to 500 parts by weight per 100 parts by weight of the polyacetal copolymer. When this amount exceeds 500 parts by weight, the mechanical properties of polyacetal such as creep properties, fatigue properties, lubrication properties, etc., are degraded to a great extent. The above amount of the polyvinyl polymer is preferably 5 to 200 parts by weight.

When no polyvinyl polymer is incorporated, the polyacetal resin composition is required to contain the polyacetal copolymer and the polyoxymethylene.

The amount of the polyoxymethylene is required to be in the range of 0 to 1,700 parts by weight per 100 parts by weight of the polyacetal copolymer. When this amount exceeds 1,700 parts by weight, the surface decorating performance is degraded, and this tendency becomes dominant when no polyvinyl polymer is added. The above amount of the polyoxymethylene is preferably 0 to 1,500 parts by weight. When no polyoxymethylene is incorporated, the polyacetal resin composition is required to contain the polyacetal copolymer and the polyvinyl polymer.

In the polyacetal resin composition of this invention, the polyacetal copolymer functions as a compatibilizer for the polyoxymethylene and the polyvinyl polymer, and the composition of this invention is often obtained as a homogeneous polymer alloy.

Depending upon the desired use and the intended purpose, the composition of this invention may contain conventional auxiliaries such as a thermal stabilizer, an antioxidant, a parting agent, a weatherability improver, an antistatic agent, a colorant, a reinforcing agent, a surfactant and an inorganic filler.

The composition of this invention is, in general, melt-mixed with an extruder, and it can be produced into molded articles by a conventional molding method such as by injection molding or by extrusion. The molding is usually carried out at a temperature between 170° C. and 300° C.

EXAMPLES the present invention will be more specifically explained by reference to the following Examples, which, however, shall not limit this invention.

The following measurements were carried out, and data therefrom are shown in the Examples.

Reduced viscosity: A value obtained by a measurement of 0.5 g/dl of a polymer in a p-chlorophenol/tetrachloroethylene (weight ratio 1 : 1) solution at 60° C.

$R_{\nu 222}$ An index for the thermal stability of a polymer. A heating loss when a polymer whose unstable terminal portion has been stabilized with acetic anhydride is heated under vacuum at 222° C. for 60 minutes. A higher value for $R_{\nu 222}$ shows better thermal stability.

Crosscut test: Test for bond strength of a coating. The measurement was carried out according to JIS K 5400. A coating on a test piece was cross cut lengthwise and widthwise 11 times at intervals of 1 mm each to form 100 squares within a 1 cm² square. A cellophane tape was applied thereto, and peeled off. The bond strength of the coating was evaluated on the basis of the number of 1 mm × 1 mm squares. A smaller number of the squares which were peeled off shows a higher bond strength. A coating surface having higher bond strength has a better decorating performance.

Abrasion wear: A measure of mechanical properties. The measurement was carried out according to JIS K 7218A by using a pressing material S45C under a surface pressure of 1 Kg/cm², a linear speed of 24 cm/sec and a run distance of 50 km. Less abrasion wear shows better mechanical properties.

MI: A measure for molecular weight. The measurement was carried out according to the conditions of ASTM D-1238 E.

EXAMPLE 1

(1) Production of Polyacetal Copolymer

Fully dehydrated and dried p-formaldehyde was pyrolyzed at 150° C., and passed through a cooling trap several times to give a formaldehyde gas having a purity of not less than 99.9%. 300 Grams/hour of the formaldehyde gas was introduced into 1,500 g of toluene containing $1.0 \times 10^{-4}$ mol/l of tetrabutylammonium acetate and $8.1 \times 10^{-3}$ mol/l of

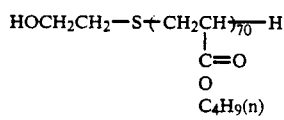

(polybutyl acrylate whose one terminal was modified to hydroxyl, $\overline{M}_n = 9,000$, "PBA-9" hereinafter) as a molecular weight regulator. Simultaneously with the introduction of the formaldehyde, toluene containing $1.0 \times 10^{-4}$ mol/l of tetrabutylammonium acetate and $8.1 \times 10^{-3}$ mol/l of PBA-9 was continuously introduced at a rate of 1,500 g/hour for 4 hours. The formaldehyde gas was also continuously introduced at a rate of 300 g/hour, during which the polymerization temperature was maintained at 60° C. Toluene containing a polymer was continuously extracted in such an amount that met with the supply, and the polymer was isolated by filtration. The polymer was fully washed with hot acetone and dried under vacuum at 60° C. to give 1,050 g of a white polymer. This polymer was subjected to extraction in chloroform at 60° C. for 5 hours to show an extraction of PBA-9.

(2) Determination of Structure of Polyacetal Copolymer

5 Grams of the polyacetal copolymer obtained in step (1) of Example (1) above was dispersed in 95 g of a 0.1 N hydrochloric acid aqueous solution, and the resultant dispersion was heated at 90° C. for 2 hours. This heating procedure converted the oxymethylene-recurring unit portions back to formaldehyde under complete hydrolysis. Meanwhile, the molecular weight regulator did not undergo hydrolysis under the above conditions. Then, the resultant solution was neutralized with a 0.5 N sodium hydroxide aqueous solution, the solution was evaporated under atmospheric pressure, and the remainder was extracted by adding 50 g of tetrahydrofuran. The resultant extract liquid was quantitatively determined by liquid chromatography, whereby $13.4 \times 10^{-4}$ moles of PBA-9 per mole of formaldehyde was detected.

The polyacetal copolymer obtained in step (1) was subjected to infrared absorption spectrum analysis to the determine ester groups, whereby $9.42 \times 10^{-2}$ moles of ester groups

from PBA-9 per mole of formaldehyde were detected.

50 Grams of the polyacetal copolymer obtained in step (1), 500 g of acetic anhydride and 0.1 g of sodium acetate were together heated at 139° C. for 3 hours for terminal acetylation, and 46 g of the polymer was recovered. The polymer was subjected to infrared absorption spectrum analysis to determine the ester groups, whereby $9.48 \times 10^{-2}$ moles of the ester groups per mole of formaldehyde were detected. The ester groups determined by this analysis include the ester group

derived from PBA-9 and the ester group

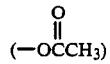

corresponding to the terminal hydroxyl group of the polymer.

The above analysis and results show that the polymer had an oxymethylene chain of which the number average molecular weight was 18,300, and the polymer was a polyacetal copolymer having the following structure:

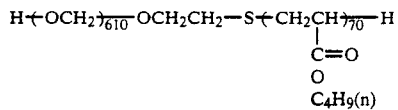

(3) Determination of Physical Properties and Coatability of Polyacetal Copolymer The polyacetal copolymer obtained in step (1) had a reduced viscosity of 1.34, which was the desired amount. The polyacetal copolymer exhibited an $R_{\nu 222}$ of 99% and had an excellent thermal stability. A stabilizer was added to the polyacetalcopolymer which had been terminal-stabilized, the mixture was molded, and the resultant article was coated with a urethane-based coating composition. The coating was dried at a predetermined temperature for a predetermined period of time. The resultant test piece was subjected to a crosscut test to evaluate its coatability. The results of the crosscut test showed excellent coatability and the number of squares peeled off was 0/100.

EXAMPLE 2

(1) Production of Polyacetal Copolymer

Fully dehydrated and dried p-formaldehyde was pyrolyzed at 150° C., and passed through a cooling trap several times to give a formaldehyde gas having a purity of not less than 99.9%. 300 grams/hour of the formaldehyde gas was introduced into 1,500 g of toluene containing $1.0 \times 10^{-4}$ mol/l of tetrabutylammonium acetate and $5.35 \times 10^{-3}$ mol/l of

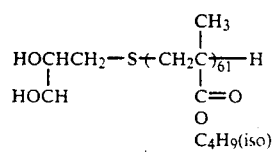

(polybutyl methacrylate whose one terminal end was modified to hydroxyl $\overline{M}_n = 8,800$, "PBA-2" hereinafter) as a molecular weight regulator. Simultaneously with the introduction of the formaldehyde, toluene containing $1.0 \times 10^{-4}$ mol/l of tetrabutylammonium acetate and $5.35 \times 10^{-3}$ mol/l of PBA-2 was continuously introduced at a rate of 1,500 g/hour for 4 hours. The formaldehyde gas was also continuously introduced at a rate of 300 g/hour, during which the polymerization temperature was maintained at 60° C. Toluene containing a polymer was continuously extracted in such an amount that met with the supply, and the polymer was isolated by filtration. The polymer was fully washed with hot acetone and dried under vacuum at 60° C. to give 1,120 g of a white polymer. This polymer was subjected to extraction in chloroform at 60° C. for 5 hours to show no extraction of PBA-2.

(2) Determination of Structure of Polyacetal Copolymer

5 Grams of the polyacetal copolymer obtained in step (1) was dispersed in 95 g of a 0.1 N hydrochloric acid aqueous solution, and the resultant dispersion was heated at 90° C. for 2 hours. This heating procedure converted oxymethylene-recurring unit portions back to formaldehyde under complete hydrolysis. Meanwhile, the molecular weight regulator did not undergo hydrolysis under the above conditions. Then, the resultant solution was neutralized with a 0.5 N sodium hydroxide aqueous solution, the solution was evaporated under atmospheric pressure, and the remainder was extracted by adding 50 g of tetrahydrofuran. The resultant liquid extract was determined by liquid chromatography, whereby $6.82 \times 10^{-4}$ mol of PBA-2 per mole of formaldehyde was detected.

The polyacetal copolymer obtained in step (1) was subjected to infrared absorption spectrum analysis to determine the ester groups, whereby $46.9 \times 10^{-3}$ mol of ester groups

($-COC_4H_9$(iso))

(iso derived from PBA-2 per mole of formaldehyde were detected.

50 Grams of the polyacetal copolymer obtained in step (1), 500 g of acetic anhydride and 0.1 g of sodium acetate were together heated at 139° C. for 3 hours for terminal acetylation, and 46 g of the polymer was recovered. The polymer was subjected to infrared absorption spectrum analysis to determine the ester groups, whereby $48.6 \times 10^{-3}$ mol of the ester groups per mole of formaldehyde were detected. The ester groups determined by this analysis contained the ester group

($-COC_4H_9$(iso))

derived from PBA-2 and the ester group

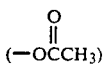
($-OCCH_3$)

corresponding to the terminal hydroxyl group of the polymer.

The above analysis and results show that the polymer had an oxymethylene chain of which the number average molecular weight was 16,200, and the polymer was a polyacetal copolymer having the following structure:

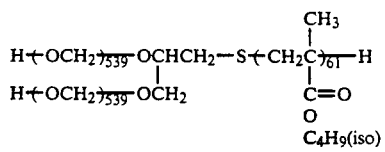

(3) Determination of Physical Properties and Coatability of Polyacetal Copolymer The polyacetal copolymer obtained in step (1) had a reduced viscosity of 1.43, which was the desired amount The polyacetal copolymer exhibited an $R_{\nu 222}$ of 98.9% and had an excellent thermal stability. A stabilizer was added to the polyacetal copolymer, the mixture was molded, and the resultant article was coated with a urethane-based coating composition. The coating was dried at a predetermined temperature for a predetermined period of time. The resultant test piece was subjected to a crosscut test to evaluate its coatability. The results of the crosscut test showed excellent coatability in which the number of squares peeled off was 0/100.

EXAMPLE 3

The "production of polyacetal copolymer" in Example 1 was repeated except that PBA-9 was replaced with a molecular weight regulator of

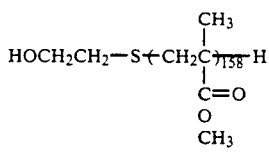

(polymethyl methacrylate whose one terminal portion was modified to hydroxyl, $\overline{M}_n = 16,000$). The resultant polymer had a reduced viscosity of 1.84 and exhibited $R_{\nu 222}$ of 99.1. The polymer also had a number average molecular weight of 43,000. Further, the polymer was found to be a polyacetal copolymer having the following structure:

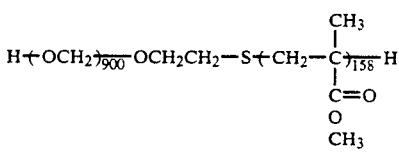

The above polyacetal copolymer was used for the evaluation of the coatability of an article molded therefrom. In a crosscut test (using a urethane-based coating composition), the molded article showed excellent coatability in which the number of squares peeled off was 0/100.

EXAMPLE 4

The "production of polyacetal copolymer" in Example 1 was replaced with a molecular weight regulator of

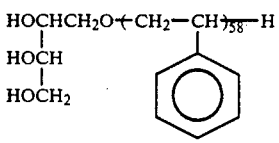

(polystyrene whose one terminal portion was modified to hydroxyl $\overline{M}_n=6,000$). The resultant polymer had a reduced viscosity of 1.28 and exhibited an $R_{v222}$ of 98.8. The polymer also had a number average molecular weight of 47,400. Further, the polymer was found to be a polyacetal copolymer having the following structure:

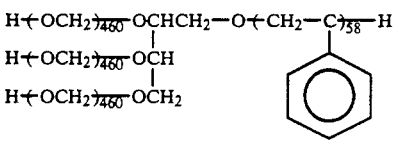

The above polyacetal copolymer was used for the evaluation of the coatability of an article molded therefrom. In a crosscut test (using a urethane-based coating composition), the molded article showed excellent coatability in which the number of squares peeled off was 0/100.

EXAMPLE 5

(1) Production of Polyacetal Copolymer

A kneader having two Σ-formed stirring blades was charged with 500 g of fully purified trioxane, 10 g of ethylene oxide and 165 g of a molecular weight regulator of

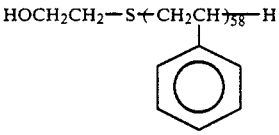

(polystyrene whose one terminal portion was modified into hydroxyl, $\overline{M}_n=6,000$, "PS-5" hereinafter), and the charged components were heated to 70° C. Then, the kneader was charged with 0.25 g of boron trifluoride dibutyl etherate, and the resultant mixture was heated for 35 minutes. Immediately thereafter, 10 g of tributylamine was added to terminate the polymerization. The reaction mixture was taken out of the kneader, and washed with hot acetone to give 460 g of a polyacetal copolymer. This polymer was subjected to extraction in chloroform at 60° C. for 5 hours to show no extraction of PS-5.

(2) Determination of Structure of Polyacetal Copolymer

Hydrolysis of the polyacetal copolymer obtained in step (1) showed that the insertion ratio of oxyethylene units in this polymer was 1.5 mol per 100 mol of oxymethylene units. The amount of PS-5 in this polymer was $15.1 \times 10^{-4}$ mol per mole of formaldehyde.

The terminal hydroxy group of the polyacetal copolymer obtained in step (1) was quantitatively determined by acetylation to show $20.2 \times 10^{-4}$ mol per mole of formaldehyde. This polymer was found to have an oxymethylene chain in which the number average molecular weight was 17,000 and which has the following structure:

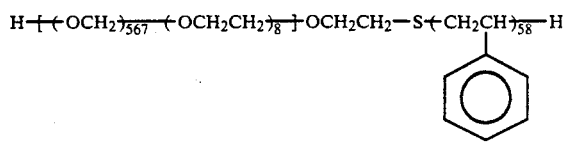

The structural formula $-[(OCH_2)_{567}(OCH_2CH_2)_8]-$ shows an insertion of 8 mol of oxyethylene units into 567 mol of oxymethylene units and does not define a distribution of the oxyethylene units in the polymer chain.

The above polyacetal copolymer had the desired molecular weight and also had a reduced viscosity of 1.58, as expected. It also exhibited an $R_{v222}$ of 98.7% and an excellent coatability of 12/100 in a crosscut test (using a urethane-based coating composition).

EXAMPLE 6

(1) Production of Polyacetal Copolymer

A kneader having two Σ-formed stirring blades was charged with 500 g of fully purified trioxane, 25 g of 1,4-butanediol formal and 150 g of a molecular weight regulator of

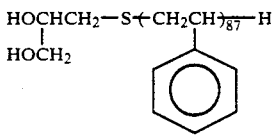

(polystyrene whose one terminal portion was modified into hydroxyl, $\overline{M}_n=9,000$, "PS-2" hereinafter), and the charged components were heated to 70° C. Then, the kneader was charged with 0.25 g of boron trifluoride dibutyl etherate, and the resultant mixture was heated for 35 minutes. Immediately thereafter, 10 g of tributylamine was added to terminate the polymerization. The reaction mixture was taken out of the kneader and washed with hot acetone to give 460 g of a polyacetal copolymer. This polymer was subjected to extraction in chloroform at 60° C. for 5 hours to show no extraction of PS-2.

(2) Determination of Production of Polyacetal Copolymer

Hydrolysis of the polyacetal copolymer obtained in step (1) showed that the insertion ratio of oxytetramethylene units in this polymer was 1.5 mol per 100 mol of oxymethylene units. The amount of PS-2 in this polymer was $7.67 \times 10^{-4}$ mol per mole of formaldehyde.

The terminal hydroxy group of the polyacetal copolymer obtained in step (1) was quantitatively determined by acetylation to show $188 \times 10^{-5}$ mol per mole of formaldehyde. This polymer was found to have an oxymethylene chain in which the number average molecular weight was 31,800 and which has the following structure:

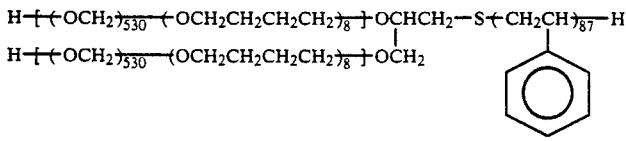

The structural formula of $+(OCH_2)_{53}(OCH_2CH_2CH_2CH_2)_{8}+$ shows an insertion of 8 mol of oxytetramethylene units into 530 mol of oxymethylene units and does not define a distribution of the oxyethylene units in the polymer chain.

The above polyacetal copolymer also exhibited an excellent coatability of 0/100 in the crosscut test (using an acrylic coating composition).

EXAMPLE 7

Example 5 was repeated except that a molecular weight regulator of

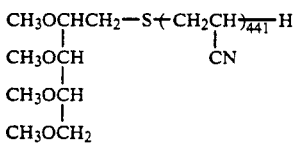

(acrylonitrile whose one terminal portion was modified into hydroxyl, $\overline{M}_n = 24,000$) was used in place of PS-5. The resultant polymer had a reduced viscosity of 2.3 and an $R_{v222}$ of 98.7%. It was also found to have a number average molecular weight of 89,000 and to have the following structural formula:

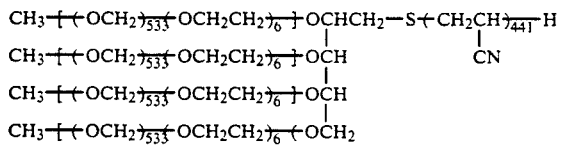

The structural formula of $+(OCH_2)_{533}(OCH_2CH_2)_{6}+$ shows the insertion of 6 mol of oxyethylene units into 533 mol of oxymethylene units, and does not define a distribution of the oxymethylene units in the polymer chain.

The above polyacetal copolymer also exhibited an excellent coatability of 0/100 in the crosscut test (using an acrylic coating composition).

COMPARATIVE EXAMPLE 1

Example 1 was repeated except that a know molecular weight regulator, methanol, was used in place of PBA-9. The resultant polymer had a reduced viscosity of 1.64 and an $R_{v222}$ of 98.9%. It was also found to have a number average molecular weight of 26,000. It had the structural formula of $CH_2O+CH_2O)_{870}H$.

A molded article therefrom was evaluated for coatability by the crosscut test (using a urethane-based coating composition) and had a value of 100/100, or no coatability.

COMPARATIVE EXAMPLE 2

Example 1 was repeated except that the following polymers having no functional group at one end were used in place of PBA-9:
(1) Vinyl acetate/methylacrylic acid copolymer, and
(2) Vinyoxyethylamine/isobutyl methacrylate copolymer.

The resultant polymers had a reduced viscosity of 0.8 in the case of (1) and a reduced viscosity of 1.1 in the case of (2). Each of molded articles therefrom was evaluated for Coatability by the crosscut test (using a urethane-based coating composition) and had a valve of 100/100, or no coatability.

Each of the polymers obtained in this Comparative Example was a graft copolymer in which the trunk polymer was formed from a vinyl acetate/methacrylic acid copolymer or from a vinyloxyethylamine/isobutyl methacrylate copolymer and the branch polymer was formed from polyoxymethylene.

COMPARATIVE EXAMPLE 3

Example 5 was repeated except that a vinyl polymer having no functional group at one end, i.e. Polymethyl methacrylate was used in place of PS-5. The resultant polymer had a reduced viscosity of 0.7. This polymer was evaluated for coatability by the crosscut test (using an acrylic coating composition) and had a value of 100/100, or no coatability.

The polymer obtained in this Comparative Example was a graft copolymer in which the trunk polymer was formed from polymethyl methacrylate and the branch polymer was formed from polyoxymethylene.

EXAMPLES 8–31 AND COMPARATIVE EXAMPLES 4–9

Starting materials, cyclic ethers and molecular weight regulators shown in Table 1 were used to produce polyacetal copolymers shown in Table 2. Table 2 shows reduced viscosities, coatabilities (evaluated with an acrylic coating composition) and abrasion wear of the polyacetal copolymers. In all of the Examples of the invention, the polyacetal copolymers exhibited excellent coatability, and all of these polyacetal copolymers were novel.

On the other hand, in Comparative Examples 4, 5, 6, and 7, the polymers exhibited no coatability. In Comparative Examples 8 and 9, the polymers exhibited poor mechanical properties although they had improved coatability.

In addition, of the molecular weight regulators shown in Table 1, those having the following structure $+(C)_q(E)_r+$ are copolymers composed of q mol of a monomer C and r mol of a monomer E (and this description does not define any blocks of the C polymer and the E polymer).

EXAMPLE 32

(1) Production of Polyacetal Resin Composition (A) Polyacetal copolymer; the polyacetal copolymer produced in Example 1.

(B) Polyvinyl polymer; a polymer having a weight average molecular weight of 150,000, obtained by polymerization of n-butyl acrylate in the presence of AIBN (radical polymerization initiator).

(C) Polyoxymethylene; a polymer having an MI of 5.8 (g/10 minutes), obtained by homopolymerizing formaldehyde in the presence, as a catalyst, of dibutyltin methoxide (anionic polymerization catalyst) and stabilizing the terminal portion of the resultant polymer with acetic anhydride.

| Polyacetal copolymer (A) | 100 parts by weight |
|---|---|
| Polyvinyl polymer (B) | 100 parts by weight |
| Polyoxymethylene (C) | 50 parts by weight |
| Thermal stabilizer Nylon 66 | 0.5 part by weight |
| Antioxidant [2,2-methylenebis(4-methyl-6-tert-butylphenol, "OA" hereinafter) | 0.4 part by weight |

The above components were mixed, and then melted in a 30 mm-diameter twin-screw extruder.

(2) Physical Properties of Polyacetyl Resin Composition

The resultant polyacetal resin composition had excellent mechanical properties, i.e. MI of 4.2 (g/10 minutes) and an abrasion wear of $1.2 \times 10^4$ (g/km). This composition exhibited a crosscut test result of 0/100 (the test using an acrylic coating composition), and thus it had excellent surface decorating properties.

EXAMPLE 33

(1) Production of Polyacetal Resin Composition (A) Polyacetal copolymer; the polyacetal copolymer produced in Example 2.

(B) Polyvinyl polymer; a polymer having a weight average molecular weight of 180,000, obtained by polymerization of iso-butyl methacrylate in the presence of AIBN.

(C) Polyoxymethylene; a polymer having an MI of 27.0 (g/10 minutes), obtained by copolymerizing trioxane and ethylene oxide in the presence, as a catalyst, of boron trifluoride (cationic polymerization catalyst) and stabilizing the resultant polymer by melting and hydrolyzing it in an extruder with triethylamine-water.

| Polyacetal copolymer (A) | 200 parts by weight |
|---|---|
| Polyvinyl polymer (B) | 50 parts by weight |
| Polyoxymethylene (C) | 100 parts by weight |
| Nylon 66 | 0.5 part by weight |
| AO | 0.4 part by weight |

The above components were mixed, and then melted in a 65 mm-diameter twin-screw extruder.

(2) Physical Properties of Polyacetal Resin Composition

The resultant polyacetal resin composition had excellent mechanical properties, i.e. an MI of 18.1 (g/10 minutes) and an abrasion wear of $1.4 \times 10^{-4}$ (g/km). This composition exhibited a crosscut test result of 0/100 (the test using an acrylic coating composition), and was therefore found to have excellent surface decorating properties.

EXAMPLE 34

(1) Production of Polyacetal Resin Composition (A) Polyacetal copolymer; the polyacetal copolymer produced in Example 3.

(B) Polyvinyl polymer; a polymer having a weight average molecular weight of 190,000, obtained by polymerization of methyl methacrylate in the presence of AIBN.

(C) Polyoxymethylene; a polymer having an MI of 15.0 (g/10 minutes), obtained by copolymerizing trioxane and 1,4-butanediol formal oxide in the presence, as a catalyst, of boron trifluoride dibutyl etherate (cationic polymerization catalyst) and stabilizing the resultant polymer by melting and hydrolyzing it in an extruder.

| Polyacetal copolymer (A) | 100 parts by weight |
|---|---|
| Polyvinyl polymer (B) | 200 parts by weight |
| Polyoxymethylene (C) | 300 parts by weight |
| Nylon 66 | 0.5 part by weight |
| AO | 0.4 part by weight |

The above components were mixed, and then melted in a 45 mm-diameter twin-screw extruder.

(2) Physical Properties of Polyacetal Resin Composition

The resultant polyacetal resin composition had excellent mechanical properties, i.e. an MI of 4.1 (g/10 minutes) and an abrasion wear of $1.5 \times 10^{-4}$ (g/km) This composition exhibited a crosscut test result of 0/100 (the test using an acrylic coating composition), and was therefore found to have excellent decorating properties.

EXAMPLE 35

(1) Production of Polyacetal Resin Composition (A) Polyacetal copolymer; the polyacetal copolymer produced in Example 4.

(B) Polyvinyl polymer; a polymer having a weight average molecular weight of 200,000, obtained by polymerization of styrene in the presence OF AIBN.

| Polyacetal copolymer (A) | 100 parts by weight |
|---|---|
| Polyvinyl polymer (B) | 50 parts by weight |
| Thermal stabilizer Nylon 66 | 0.5 part by weight |
| Antioxidant AO | 0.4 part by weight |

The above components were mixed, and then melted in a 30 mm-diameter twin-screw extruder to produce a polyacetal resin composition.

(2) Physical Properties of Polyacetal Resin Composition

The resultant polyacetal resin composition had excellent mechanical properties, i.e. an MI of 6.8 (g/10 minutes) and an abrasion wear of $1.1 \times 10^{-4}$ (g/km). This composition exhibited a crosscut test result of 0/100 (the test using an acrylic coating composition), and thus had excellent surface decorating properties.

EXAMPLE 36

(1) Production of Polyacetal Resin Composition (A) Polyacetal copolymer; the polyacetal copolymer produced in Example 19.

(B) Polyvinyl polymer; a polymer having a weight average molecular weight of 250,000, obtained by copolymerization of methyl methacrylate an iso-butyl methacrylate in the presence of AIBN.

| Polyacetal copolymer (A) | 100 parts by weight |
|---|---|
| Polyvinyl polymer (B) | 50 parts by weight |
| Nylon 66 | 0.5 part by weight |

| | |
|---|---|
| -continued | |
| AO | 0.4 part by weight |

The above components were mixed, and then melted in a 65 mm-diameter twin-screw extruder to produce a polyacetal resin composition.

(2) Physical Properties of Polyacetal Resin Composition

The resultant polyacetal resin composition had excellent mechanical properties, i.e. an MI of 19.2 (g/10 minutes) and an abrasion wear of $2.0 \times 10^{-4}$ (g/km). This composition exhibited a crosscut test result of 0/100 (the test using an acrylic coating composition), and was therefore found to have excellent surface decorating properties.

EXAMPLE 37

(1) Production of Polyacetal Resin Composition (A) Polyacetal copolymer; a polyacetal copolymer produced in Example 29.

(B) Polyvinyl polymer; a polymer having a weight average molecular weight of 170,000, obtained by copolymerization of acrylonitrile and styrene in the presence of AIBN.

| | |
|---|---|
| Polyacetal copolymer (A) | 100 parts by weight |
| Polyvinyl polymer (B) | 125 parts by weight |
| Nylon 66 | 0.5 part by weight |
| AO | 0.4 part by weight |

The above components were mixed, and then melted in a 45 mm-diameter twin-screw extruder to produce a polyacetal resin composition.

(2) Physical Properties of Polyacetal Resin Composition

The resultant polyacetal resin composition had excellent mechanical properties, i.e. an MI of 8.0 (g/10 minutes) and an abrasion wear of $4.9 \times 10^{-4}$ (g/km). This composition exhibited a crosscut test result of 0/100 (the test using a two-package-curable acrylic coating composition), and was thus found to have excellent surface decorating properties.

EXAMPLE 38

(1) Production of Polyacetal Resin Composition (A) Polyacetal copolymer; the polyacetal copolymer produced in Example 1.

(C) Polyoxymethylene; the polyoxymethylene produced in Example 32.

| | |
|---|---|
| Polyacetal copolymer (A) | 300 parts by weight |
| Polyoxmethylene (C) | 100 parts by weight |
| Nylon 66 | 0.5 part by weight |
| AO | 0.4 part by weight |

The above components were melted in a 30 mm-diameter twin-screw extruder to produce a polyacetal resin composition.

(2) Physical Properties of Polyacetal Resin Composition

The resultant polyacetal resin composition had excellent mechanical properties, i.e. an MI of 12.3 (g/10 minutes) and an abrasion wear of $15 \times 10^{-4}$ (g/km). This composition exhibited a crosscut test result of 0/100 (the test using an acrylic coating composition), and was thus found to have excellent surface decorating properties.

EXAMPLES 39–70

(1) Production of Polyacetal Resin Compositions (A) Polyacetal copolymers; respectively obtained by adding dibutyltin dimethoxide, as a polymerization catalyst, to toluene containing a predetermined concentration of a polymer as a molecular weight regulator shown in Table 3, then adding formaldehyde, separating the toluene and the resultant polymer after a predetermined period of time, and stabilizing the polymer with acetic anhydride.

(B) Polyvinyl polymers; respectively obtained by homopolymerizing or copolymerizing vinyl monomer(s) shown in Table 3 in the presence of benzoyl peroxide or AIBN.

(C) Polyoxymethylene; a polymer having an MI of 15.2 (g/10 minutes), obtained by homopolymerizing formaldehyde in the presence, as a catalyst, of dimethyldistearylammonium propionate (anionic polymerization catalyst), and stabilizing the terminal portion of the resultant polymer with acetic anhydride.

The polyvinyl polymer (B) and the polyoxymethylene (C), of which the amounts (part by weight) are shown in Table 5, and 0.32 part by weight of a thermal stabilizer Nylon 66 and 0.4 part by weight of an antioxidant AO were added to 100 parts by weight of the polyacetal copolymer (A), and these components were melt-mixed in a 30 mm-diameter twin-screw extruder.

(2) Physical Properties of Polyacetal Resin Compositions

Table 3 shows mechanical properties and results of a crosscut test (using an acrylic or urethane coating composition) of the compositions produced above. All of the compositions had excellent surface decorating properties and excellent mechanical properties in combination.

COMPARATIVE EXAMPLES 10–12

0.5 Part by weight of Nylon 66 and 0.4 part of AO were added to 100 parts by weight of each of the polyoxymethylene obtained in the same way as in Example 32, 33 and 34, and these components in each case were melt-mixed with a 30 mm-diameter twin-screw extruder to obtain compositions. Table 3 shows physical properties and crosscut test results of the compositions. The coatability of each of these compositions was very poor.

COMPARATIVE EXAMPLES 13 and 14

A polyvinyl polymer synthesized from iso-butyl acrylate and a polyoxymethylene obtained in the same way as in Example 32 in the amounts shown in Table 3 were added to 100 parts by weight of the same polyacetal copolymer as that obtained in Example 9, and 0.5 part of Nylon 66 and 0.4 part of AO were added. Then, these components were melt-mixed with a 30 mm-diameter twin-screw extruder. Table 3 shows the physical properties and the crosscut test results of the resultant compositions.

The composition obtained in Comparative Example 13 had poor surface decorating properties since it contained an excess of the polyoxymethylene.

The composition obtained in Comparative Example 14 had very poor surface decorating properties since it contained an excess of the polyoxymethylene.

COMPARATIVE EXAMPLES 15 and 16

A polyvinyl polymer synthesized from methyl methacrylate and a polyoxymethylene obtained in the same way as in Example 33 in the amounts shown in Table 3 were added to 100 parts by weight of the same polyacetal copolymer as that obtained in Example 12, and 0.5 part by weight of Nylon 66 and 0.4 part by weight of AO were added. These components were melt-mixed with a 30 mm-diameter twin-screw extruder. Table 3 shows the physical properties and the crosscut test results of the resultant compositions.

These compositions had extraordinarily degraded mechanical properties since they contained an excess of the polyvinyl polymer.

REFERENTIAL EXAMPLE 1

(1) Production of Polyacetal Resin Composition (B) Polyvinyl polymer; a polymer having a weight average molecular weight of 130,000, obtained by polymerizing methyl methacrylate in the presence of AIBN (radical polymerization catalyst).

(C) Polyoxymethylene; the same polyoxymethylene as that produced in Example 32.

| | |
|---|---|
| Polyoxymethylene (C) | 100 parts by weight |
| Polyvinyl polymer (B) | 20 parts by weight |
| Nylon 66 | 0.5 part by weight |
| AO | 0.4 part by weight |

These components were mixed, and then melted in a 30 mm-diameter twin-screw extruder.

(2) Physical Properties of Polyacetal Resin Composition

The resultant composition had poor mechanical properties, i.e. an MI of 2.8 (g/10 minutes) and an abrasion wear of $9.7 \times 10^{-3}$ (g/km). Further, this composition exhibited poor surface decorating properties, i.e. a crosscut test result of 100/100 (the test using an acrylic coating composition). These poor properties were brought about by a phase separation of the polyvinyl polymer which resulted since the composition was a mere mixture of the polyoxymethylene with the polyvinyl polymer.

REFERENTIAL EXAMPLE 2

(B) Polyvinyl polymer; the same polyvinyl polymer as that produced in Example 33 (poly-iso-butyl methacrylate).

(C) Polyoxymethylene; the same polyoxymethylene as that produced in Example 32.

| | |
|---|---|
| Polyoxymethylene (C) | 100 parts by weight |
| Polyvinyl polymer (B) | 10 parts by weight |
| Nylon 66 | 0.5 parts by weight |
| AO | 0.4 parts by weight |

These components were mixed, and then melted in a 30 mm-diameter twin-screw extruder.

(2) Physical Properties of Polyacetal Resin Composition

The resultant composition had poor mechanical properties, i.e. an MI of 2.7 (g/10 minutes) and an abrasion wear of $6.1 \times 10^{-3}$ (g/km). Further, this composition exhibited poor surface decorating properties, i.e. a crosscut test result of 100/100 (the test using an acrylic coating composition). As described in Referential Example 1, these poor properties were brought about by a phase separation of the polyvinyl polymer which resulted since the composition was a mere mixture of the polyoxymethylene with the polyvinyl polymer.

In general, a molded article of a polyacetal resin has an inactive surface, and therefore requires a primer treatment in order to decorate the surface. In contrast, a molded article of the composition of the polyacetal copolymer of this invention has unconventionally excellent surface decorating properties. Such excellent properties are derived from the following: In the polyacetal copolymer of this invention, the polyacetal copolymer not only contains the vinyl polymer group (B) but also has a structure in which polyoxymethylene is bonded to one terminal portion of the vinyl polymer group. In the composition of this invention, the polyacetal copolymer has the function of a compatibilizer like that of the polyvinyl polymer and the polyoxymethylene.

TABLE 1

| Example | Starting material | Cyclic ether | Molecular weight regulator | |
|---|---|---|---|---|
| 8 | Formaldehyde | — | $\text{HOCH}_2\text{CH}_2-\text{S}+\text{CH}_2-\text{CH}{\overline{)_{187}}}\text{H}$<br>$\phantom{\text{HOCH}_2\text{CH}_2-\text{S}+\text{CH}_2-}\,\,\,\mid$<br>$\phantom{\text{HOCH}_2\text{CH}_2-\text{S}+\text{CH}_2-}\text{C}=\text{O}$<br>$\phantom{\text{HOCH}_2\text{CH}_2-\text{S}+\text{CH}_2-}\text{O}$<br>$\phantom{\text{HOCH}_2\text{CH}_2-\text{S}+\text{CH}_2-}\text{C}_2\text{H}_5$ | Mn = 19,000 |
| 9 | Formaldehyde | — | $\text{HOCHCH}_2-\text{S}+\text{CH}_2-\text{CH}{\overline{)_{125}}}\text{H}$<br>$\mid \phantom{\text{OCHCH}_2-\text{S}+\text{CH}_2-}\mid$<br>$\text{HOCH}_2 \phantom{-\text{S}+\text{CH}_2-}\text{C}=\text{O}$<br>$\phantom{\text{HOCH}_2-\text{S}+\text{CH}_2-}\text{O}$<br>$\phantom{\text{HOCH}_2-\text{S}+\text{CH}_2-}\text{n-C}_4\text{H}_9$ | Mn = 16,000 |
| 10 | Formaldehyde | — | $\text{HOOCCHCH}_2-\text{O}+\text{CH}_2-\text{CH}{\overline{)_{75}}}\text{H}$<br>$\mid \phantom{\text{OOCCHCH}_2-\text{O}+\text{CH}_2-}\mid$<br>$\text{HOOCCH}_2 \phantom{-\text{O}+\text{CH}_2-}\text{C}=\text{O}$<br>$\phantom{\text{HOOCCH}_2-\text{O}+\text{CH}_2-}\text{O}$<br>$\phantom{\text{HOOCCH}_2-\text{O}+\text{CH}_2-}\text{iso-C}_4\text{H}_9$ | Mn = 9,700 |

TABLE 1-continued

| Example | Starting material | Cyclic ether | Molecular weight regulator | |
|---|---|---|---|---|
| 11 | Formaldehyde | — | $\text{HOCH}_2\text{CH}_2-\text{S}+\text{CH}_2-\underset{\underset{\underset{\text{iso-C}_4\text{H}_9}{O}}{\overset{\|}{C=O}}}{\overset{CH_3}{\overset{\|}{C}}}_{125}\text{H}$ | Mn = 18,000 |
| 12 | Formaldehyde | — | $\underset{\text{HOCH}_2}{\text{HOCH}}-\text{CH}_2-\text{S}+\text{CH}_2-\underset{\underset{\underset{CH_3}{O}}{\overset{\|}{C=O}}}{\overset{CH_3}{\overset{\|}{C}}}_{83}\text{H}$ | Mn = 8,400 |
| 13 | Formaldehyde | — | $\underset{\underset{O}{\overset{\|}{NH_2\overset{\|}{C}CH_2}}}{\overset{O}{\overset{\|}{NH_2CCH}}}-\text{CH}_2-\text{O}+\text{CH}_2-\underset{\underset{\underset{n\text{-}C_8H_{17}}{O}}{\overset{\|}{C=O}}}{\overset{CH_3}{\overset{\|}{C}}}_{86}\text{H}$ | Mn = 17,000 |
| 14 | Formaldehyde | — | $\text{HO}-\text{CH}_2\text{CH}_2-\text{O}+\text{CH}_2-\underset{\underset{\underset{n\text{-}C_{11}H_{23}}{O}}{\overset{\|}{C=O}}}{\overset{CH_3}{\overset{\|}{C}}}_{49}\text{H}$ | Mn = 12,000 |
| 15 | Formaldehyde | — | $\underset{\text{HOOC}-\text{CH}_2}{\text{HOOC}-\text{CHCH}_2}-\text{S}+\text{CH}_2-\underset{\underset{\underset{n\text{-}C_{18}H_{37}}{O}}{\overset{\|}{C=O}}}{\overset{CH_3}{\overset{\|}{C}}}_{38}\text{H}$ | Mn = 13,000 |
| 16 | Formaldehyde | — | $\underset{\overset{\|}{O}}{\overset{NH_2C}{\|}}-\text{CH}_2\text{CH}_2-\text{O}+\text{CH}_2-\underset{\underset{\underset{CH_2CHC_4H_9}{\underset{C_2H_5}{}}}{\overset{\|}{C=O}}}{\overset{CH_3}{\overset{\|}{C}}}_{146}\text{H}$ | Mn = 29,000 |
| 17 | Formaldehyde | — | $\underset{\underset{\text{HOCH}_2}{\text{HOCH}}}{\text{HO}-\text{CHCH}_2}-\text{CH}_2+\text{CH}_2-\underset{\underset{\underset{CH_3}{O}}{\overset{\|}{C=O}}}{\overset{}{\overset{\|}{CH}}}_{177}\text{H}$ | Mn = 15,000 |
| 18 | Formaldehyde | — | $\underset{\underset{\text{HOOCCH}_2}{\text{HOOCCH}}}{\text{HOOCCHCH}_2}-\text{S}+\text{CH}_2-\underset{\underset{\underset{CH_3}{O}}{\overset{\|}{C=O}}}{\overset{CH_3}{\overset{\|}{C}}}_{205}\text{H}$ | Mn = 21,000 |
| 19 | Formaldehyde | — | $\text{HOCH}_2\text{CH}_2-\text{S}+(\text{CH}_2-\underset{\underset{\underset{CH_3}{O}}{\overset{\|}{C=O}}}{\overset{CH_3}{\overset{\|}{C}}})_{78}+(\text{CH}_2-\underset{\underset{\underset{C_4H_9(n)}{O}}{\overset{\|}{C=O}}}{\overset{}{\overset{\|}{CH}}})_{54}\text{H}$ | Mn = 15,000 |
| 20 | Formaldehyde | — | $\underset{\text{HOOCCH}_2}{\text{HOOCCHCH}_2}-\text{S}+(\text{CH}_2-\underset{\underset{\underset{CH_3}{O}}{\overset{\|}{C=O}}}{\overset{CH_3}{\overset{\|}{C}}})_{100}+(\text{CH}_2-\underset{\underset{\underset{C_2H_5}{O}}{\overset{\|}{C=O}}}{\overset{CH_3}{\overset{\|}{C}}})_{86}\text{H}$ | Mn = 20,000 |

TABLE 1-continued

| Example | Starting material | Cyclic ether | Molecular weight regulator | |
|---|---|---|---|---|
| 21 | Formaldehyde | — | $\text{HOCHCH}_2-\text{S}+(-\text{CH}_2-\underset{\underset{\text{iso-C}_4\text{H}_9}{\overset{\overset{\text{CH}_3}{|}}{\underset{|}{\text{C}}}=\text{O}}}{\overset{|}{\text{C}}})_{\overline{49}}(-\text{CH}_2-\underset{\underset{\text{CH}_3}{\overset{\overset{\text{CH}_3}{|}}{\underset{|}{\text{O}=\text{O}}}}}{\overset{|}{\text{C}}})_{\overline{44}}\text{H}$ HOCH | HOCH₂ | $M_n = 11,000$ |
| 22 | Formaldehyde | — | $\text{HOCHCH}_2-\text{O}+(-\text{CH}_2-\underset{\underset{\text{CH}_3}{\overset{\overset{\text{CH}_3}{|}}{\underset{|}{\text{C}}=\text{O}}}}{\overset{|}{\text{C}}})_{\overline{185}}(-\text{CH}_2-\text{CH}-)_{\overline{95}}\text{H}$ with phenyl group; HOCH, HOCH, HOCH₂ | | $M_n = 28,000$ |
| 23 | Formaldehyde | Ethylene oxide | $\text{NH}_2\text{CCH}_2\text{CH}_2-\text{S}+\text{CH}_2-\text{CH}\overline{)_{71}}\text{H}$ (with phenyl and C=O) | | $M_n = 7,500$ |
| 24 | Formaldehyde | Ethylene oxide | $\text{HOCHCH}_2-\text{O}+\text{CH}_2-\text{CH}\overline{)_{151}}\text{H}$ HOCH₂ (with phenyl) | | $M_n = 16,000$ |
| 25 | Trioxane | — | $\text{HOCH}_2\text{CH}_2-\text{S}+\text{CH}_2-\text{CH}\overline{)_{67}}\text{H}$ (with phenyl) | | $M_n = 7,000$ |
| 26 | Trioxane | — | $\text{CH}_3\text{COCHCH}_2-\text{S}+\text{CH}_2-\text{CH}\overline{)_{60}}\text{H}$, O, CHCOCH₂, O (with phenyl) | | $M_n = 6,500$ |
| 27 | Trioxane | Ethylene oxide | $\text{CH}_3\text{OCH}_2\text{CH}_2-\text{S}+\text{CH}_2-\underset{\underset{\text{CN}}{|}}{\text{CH}}\overline{)_{128}}\text{H}$ | | $M_n = 7,000$ |
| 28 | Trioxane | Ethylene oxide | $\text{NH}_2\text{CHCH}_2-\text{S}+\text{CH}_2-\underset{\underset{\text{Cl}}{|}}{\text{CH}}\overline{)_{188}}\text{H}$ NH₂CH₂ | | $M_n = 12,000$ |
| 29 | Trioxane | Ethylene glycol formal | $\text{HOOCCHCH}_2-\text{S}+(-\text{CH}_2-\text{CH}\overline{)_{38}}(\text{CH}_2-\underset{\underset{\text{CN}}{|}}{\text{CH}})_{\overline{859}})\text{H}$ HOOCCH (with phenyl) | | $M_n = 50,000$ |
| 30 | Trioxane | Ethylene oxide | $\text{CH}_3\overset{\text{O}}{\underset{\|}{\text{OC}}}\text{CHCH}_2-\text{S}+(-\text{CH}_2-\text{CH}\overline{)_{76}}(\text{CH}_2\underset{\underset{\text{CN}}{|}}{\text{CH}})_{\overline{101}})\text{H}$, $\text{CH}_3\overset{\text{O}}{\underset{\|}{\text{OC}}}\text{CH}$, $\text{CH}_3\overset{\text{O}}{\underset{\|}{\text{OC}}}\text{CH}_2$ | | $M_n = 14,000$ |
| 31 | Trioxane | 1,4-Butanediol formal | $\text{NH}_2\text{CHCH}_2-\text{S}+(-\text{CH}_2-\underset{\underset{\text{Cl}}{|}}{\text{CH}})_{\overline{221}}(\text{CH}_2\underset{\underset{\text{Cl}}{|}}{\text{CH}})_{\overline{185}}\text{H}$, NH₂CH, NH₂CH, NH₂CH₂ | | $M_n = 24,000$ |

TABLE 1-continued

| Example | Starting material | Cyclic ether | Molecular weight regulator | |
|---|---|---|---|---|
| Comparative Example 4 | Formaldehyde | — | $H_2O$ | |
| Comparative Example 5 | Formaldehyde | — | $C_2H_5OH$ | |
| Comparative Example 6 | Formaldehyde | — | $HO(CH_2CH_2CH_2CH_2O)_{50}H$ Polytetramethylene glycol | |
| Comparative Example 7 | Formaldehyde | — | $HO(CH_2CH_2O)_{50}H$ Polyethylene glycol | |
| Comparative Example 8 | Formaldehyde | — | $-[(-CH_2-\underset{\underset{\underset{CH_3}{O}}{\overset{\overset{CH_3}{|}}{\underset{\|}{C=O}}}}{\overset{|}{C}})_{138}(CH_2CH)_{30}]-$ with $O-C_2H_4-NH_2$ | $Mn = 16,000$ |
| Comparative Example 9 | Formaldehyde | — | $-[(-CH_2-\underset{\underset{\underset{iso-C_4H_9}{O}}{\overset{\overset{CH_3}{|}}{\underset{\|}{C=O}}}}{\overset{|}{C}})_{197}(CH_2CH)_{15}]-$ with $O-C_2H_4-NH_2$ | $Mn = 29,000$ |

TABLE 2

| Example | Structure and Mn of polyacetal copolymer | Reduced viscosity | Abrasion wear (gr/km) | Crosscut test |
|---|---|---|---|---|
| 8 | $H(OCH_2)_{1333}OCH_2CH_2-S-(CH_2-CH(C=O-O-C_2H_5))_{187}H$, $Mn = 59,000$ | 2.1 | $2.3 \times 10^{-4}$ | 0/100 |
| 9 | $H(OCH_2)_{1170}OCH_2CH_2-S(CH_2-CH(C=O-O-n-C_4H_9))_{123}H$, $Mn = 51,000$ | 2.0 | $1.1 \times 10^{-4}$ | 0/100 |
| 10 | $H(OCH_2)_{537}OCCHCH_2-O(CH_2-CH(C=O-O-iso-C_4H_9))_{75}H$ with side chain $H(OCH_2)_{537}OCCH_2$ | 1.8 | $3.2 \times 10^{-4}$ | 0/100 |
| | $Mn = 42,000$ | | | |
| 11 | $H(OCH_2)_{2060}OCH_2CH_2-S(CH_2-C(CH_3)(C=O-O-iso-C_4H_9))_{125}H$, $Mn = 79,800$ | 2.3 | $5.1 \times 10^{-4}$ | 0/100 |
| 12 | $H(OCH_2)_{758}OCHCH_2-S(CH_2-C(CH_3)(C=O-O-CH_3))_{83}H$ with side chain $H(OCH_2)_{758}OCH_2$, $Mn = 54,000$ | 1.9 | $0.8 \times 10^{-4}$ | 0/100 |
| 13 | $H(OCH_2)_{867}NHCCHCH_2-O(CH_2-C(CH_3)(C=O-O-iso-C_8H_{17}))_{86}H$ with side chain $H(OCH_2)_{867}NHCCH_2$, $Mn = 69,000$ | 2.0 | $5.6 \times 10^{-4}$ | 0/100 |
| 14 | $H(OCH_2)_{1250}OCH_2CH_2-O(CH_2-C(CH_3)(C=O-O-n-C_{11}H_{23}))_{49}H$, $Mn = 50,000$ | 1.6 | $0.8 \times 10^{-4}$ | 0/100 |

TABLE 2-continued

| Example | Structure and Mn of polyacetal copolymer | Reduced viscosity | Abrasion wear (gr/km) | Crosscut test |
|---|---|---|---|---|
| 15 | $H(OCH_2)_{750}OC-CHCH_2-S(CH_2-C(CH_3))_{38}H$ <br> $\phantom{xxx}\|\|\phantom{xxxxxxxxxxxxxx}\|$ <br> $\phantom{xxx}O\phantom{xxxxxxxxxxxxxx}C=O$ <br> $H(OCH_2)_{750}OC-CH_2\phantom{xxxxxxxx}O$ <br> $\phantom{xxxxxxxxxx}\|\|\phantom{xxxxxxxxxx}n-C_{18}H_{37}$ <br> $\phantom{xxxxxxxxxx}O$ <br> Mn = 57,000 | 1.7 | $4.3 \times 10^{-4}$ | 0/100 |
| 16 | $H(OCH_2)_{1870}NHC-CH_2CH_2-O(CH_2-C(CH_3))_{146}H$ <br> $\phantom{xxxxxxxxxxxx}\|\|\phantom{xxxxxxxxxxxxxxx}\|$ <br> $\phantom{xxxxxxxxxxxx}O\phantom{xxxxxxxxxxxxxxxx}C=O$ <br> $\phantom{xxxxxxxxxxxxxxxxxxxxxxxxxxxxx}O$ <br> $\phantom{xxxxxxxxxxxxxxxxxxxxxxxxxxx}CH_2CHC_4H_9$ <br> $\phantom{xxxxxxxxxxxxxxxxxxxxxxxxxxxxxxxx}\|$ <br> $\phantom{xxxxxxxxxxxxxxxxxxxxxxxxxxxxxxx}C_2H_5$ <br> Mn = 85,000 | 2.2 | $2.8 \times 10^{-4}$ | 0/100 |
| 17 | $H(OCH_2)_{1020}OCHCH_2-S(CH_2-CH)_{177}H$ <br> $H(OCH_2)_{1020}OCH\phantom{xxxxxxxxxx}C=O$ <br> $H(OCH_2)_{1020}OCH_2\phantom{xxxxxxxxx}O$ <br> $\phantom{xxxxxxxxxxxxxxxxxxxxxxxxx}CH_3$ <br> Mn = 110,000 | 4.3 | $1.6 \times 10^{-4}$ | 0/100 |
| 18 | $H(OCH_2)_{640}OC-CHCH_2-S(CH_2-C(CH_3))_{205}H$ <br> $\phantom{xxxxxxx}\|\|\phantom{xxxxxxxxxxxxxxxx}\|$ <br> $\phantom{xxxxxxx}O\phantom{xxxxxxxxxxxxxxxx}C=O$ <br> $H(OCH_2)_{640}OC-CH\phantom{xxxxxxxx}O$ <br> $\phantom{xxxxxxx}\|\|\phantom{xxxxxxxxxxxxxxxx}CH_3$ <br> $\phantom{xxxxxxx}O$ <br> $H(OCH_2)_{640}OC-CH$ <br> $\phantom{xxxxxxx}\|\|$ <br> $\phantom{xxxxxxx}O$ <br> $H(OCH_2)_{640}OC-CH_2$ <br> $\phantom{xxxxxxx}\|\|$ <br> $\phantom{xxxxxxx}O$ <br> Mn = 98,000 | 3.9 | $2.1 \times 10^{-4}$ | 0/100 |
| 19 | $H(OCH_2)_{1130}OCH_2CH_2-S[(CH_2-C(CH_3))_{78}(CH_2-CH)_{54}]H$ <br> $\phantom{xxxxxxxxxxxxxxxxxxxxxxxx}C=O\phantom{xxx}C=O$ <br> $\phantom{xxxxxxxxxxxxxxxxxxxxxxxx}O\phantom{xxxxxx}O$ <br> $\phantom{xxxxxxxxxxxxxxxxxxxxxxxx}CH\phantom{xxxxx}n-C_4H_9$ <br> Mn = 49,000 | 1.5 | $2.9 \times 10^{-4}$ | 0/100 |
| 20 | $H(OCH_2)_{817}OCCHCH_2-S[(CH_2-C(CH))_{100}(CH_2-CH(CH_3))_{86}]H$ <br> $\phantom{xxxxxxx}\|\|\phantom{xxxxxxxxxxxxxxxxxxxx}\|\phantom{xxxxxxxxx}$ <br> $\phantom{xxxxxxx}O\phantom{xxxxxxxxxxxxxxxxxxxx}C=O\phantom{xxxx}C=O$ <br> $H(OCH_2)_{817}OCCH_2\phantom{xxxxxxxxxxxx}O\phantom{xxxxxxx}O$ <br> $\phantom{xxxxxxx}\|\|\phantom{xxxxxxxxxxxxxxxxxxxx}CH_3\phantom{xxxxx}C_2H_5$ <br> $\phantom{xxxxxxx}O$ <br> Mn = 69,000 | 1.9 | $1.7 \times 10^{-4}$ | 0/100 |
| 21 | $H(OCH_2)_{856}OCHCH_2-S[(CH_2-C(CH_3))_{49}(CH_2-C(CH_3))_{44}]H$ <br> $H(OCH_2)_{856}OCH\phantom{xxxxxxxxxxxx}C=O\phantom{xxxx}C=O$ <br> $H(OCH_2)_{856}OCH\phantom{xxxxxxxxxxxx}O\phantom{xxxxxxx}O$ <br> $\phantom{xxxxxxxxxxxxxxxxxxxxxxxxxxx}iso-C_4H_9\phantom{xx}CH_3$ <br> Mn = 88,000 | 2.1 | $3.6 \times 10^{-4}$ | 0/100 |

TABLE 2-continued

| Example | Structure and Mn of polyacetal copolymer | Reduced viscosity | Abrasion wear (gr/km) | Crosscut test |
|---|---|---|---|---|
| 22 | $H(OCH_2)_{916}OCHCH_2-O-(CH_2-\underset{\underset{CH_3}{\underset{\|}{C=O}}}{\overset{CH_3}{\overset{\|}{C}}})_{185}(CH_2-CH(C_6H_5))_{65}-H$<br>$H(OCH_2)_{916}OCH$<br>$H(OCH_2)_{916}OCH$<br>$H(OCH_2)_{916}OCH$<br>$H(OCH_2)_{916}OCH_3$<br>Mn = 130,000 | 2.6 | $2.2 \times 10^{-4}$ | 4/100 |
| 23 | $H-((OCH_2)_{1130}(OCH_2CH_2)_{11})-NHCCH_2CH_2-S(CH_2-CH(C_6H_5))_{71}-H$<br>$\underset{O}{\|}$<br>Mn = 41,000 | 1.5 | $4.1 \times 10^{-4}$ | 8/100 |
| 24 | $H-((OCH_2)_{1100}(OCH_2CH_2)_{13})-OCHCH_2-O(CH_2-CH(C_6H_5))_{151}-H$<br>$H-((OCH_2)_{1100}(OCH_2CH_2)_{13})-OCH_2$<br>Mn = 82,000 | 2.0 | $1.3 \times 10^{-4}$ | 3/100 |
| 25 | $H(OCH_2)_{1730}OCH_2CH_2-S(CH_2-CH(C_6H_5))_{67}-H$<br>Mn = 59,000 | 1.8 | $2.2 \times 10^{-4}$ | 3/100 |
| 26 | $CH_3\overset{O}{\overset{\|}{C}}(OCH_2)_{1020}O-CHCH_2-S(CH_2-CH(C_6H_5))_{60}-H$<br>$CH_3\overset{O}{\overset{\|}{C}}(OCH_2)_{1020}O-CH_2$<br>Mn = 67,500 | 1.8 | $4.8 \times 10^{-4}$ | 1/100 |
| 27 | $CH_3-((OCH_2)_{1200}(OCH_2CH_2)_{14})-OCH_2CH_2-S(CH_2-CH(CN))_{188}-H$<br>Mn = 43,000 | 1.5 | $5.1 \times 10^{-4}$ | 0/100 |
| 28 | $H-((OCH_2)_{611}(OCH_2CH_2)_{8})-NH-CHCH_2-S(CH_2-CH(Cl))_{188}-H$<br>$H-((OCH_2)_{611}(OCH_2CH_2)_{8})-NH-CH_2$<br>Mn = 49,000 | 1.7 | $2.7 \times 10^{-4}$ | 0/100 |
| 29 | $H-((OCH_2)_{903}(OCH_2CH_2))-OCCHCH_2-S-((CH_2-CH(C_6H_5))_{38}-$<br>$\underset{O}{\|}$<br>$H-((OCH_2)_{903}(OCH_2CH_2))-OCCH_2$<br>$\underset{O}{\|}$<br>$(CH_2-CH(CN))_{859}-H$<br>Mn = 101,000 | 4.7 | $0.7 \times 10^{-4}$ | 0/100 |

TABLE 2-continued

| Example | Structure and Mn of polyacetal copolymer | Reduced viscosity | Abrasion wear (gr/km) | Crosscut test |
|---|---|---|---|---|
| 30 | $CH_3\text{-}(\text{-}OCH_2\text{-})_{\overline{833}}\text{-}(\text{-}OCH_2CH_2\text{-})_{\overline{13}}\text{-}\overset{O}{\underset{\|}{C}}CHCH_2\text{-}S\text{-}(\text{-}CH_2\text{-}CH\text{-})_{\overline{76}}\text{-}$<br>$CH_3\text{-}(\text{-}OCH_2\text{-})_{\overline{833}}\text{-}(\text{-}OCH_2CH_2\text{-})_{\overline{13}}\text{-}\overset{O}{\underset{\|}{C}}CH$ — (phenyl)<br>$CH_3\text{-}(\text{-}OCH_2\text{-})_{\overline{833}}\text{-}(\text{-}OCH_2CH_2\text{-})_{\overline{13}}\text{-}\overset{O}{\underset{\|}{C}}CH_2$<br>$(\text{-}CH_2CH\text{-})_{\overline{1011}}\text{-}H$ with CN side group<br>Mn = 89,000 | 2.3 | $1.6 \times 10^{-4}$ | 0/100 |
| 31 | $H\text{-}(\text{-}OCH_2\text{-})_{\overline{867}}\text{-}(\text{-}OCH_2CH_2CH_2CH_2\text{-})_{\overline{74}}\text{-}NHCHCH_2\text{-}S\text{-}(\text{-}CH_2\text{-}CH\text{-})_{\overline{221}}\text{-}$ with Cl<br>$H\text{-}(\text{-}OCH_2\text{-})_{\overline{867}}\text{-}(\text{-}OCH_2CH_2CH_2CH_2\text{-})_{\overline{74}}\text{-}NHCH$<br>$H\text{-}(\text{-}OCH_2\text{-})_{\overline{867}}\text{-}(\text{-}OCH_2CH_2CH_2CH_2\text{-})_{\overline{74}}\text{-}NHCH$<br>$H\text{-}(\text{-}OCH_2\text{-})_{\overline{867}}\text{-}(\text{-}OCH_2CH_2CH_2CH_2\text{-})_{\overline{74}}\text{-}NHCH_2$<br>$(\text{-}CH_2CH\text{-})_{\overline{185}}\text{-}H$ with CN side group<br>Mn = 130,000 | 3.3 | $2.2 \times 10^{-4}$ | 0/100 |
| Comparative Example 4 | $HO\text{-}(\text{-}CH_2O\text{-})_{\overline{1130}}H$  Mn = 34,000 | 1.8 | $1.2 \times 10^{-4}$ | 100/100 |
| Comparative Example 5 | $C_2H_5O\text{-}(\text{-}CH_2O\text{-})_{\overline{970}}H$  Mn = 28,000 | 1.6 | $1.2 \times 10^{-4}$ | 100/100 |
| Comparative Example 6 | $H\text{-}(\text{-}OCH_2\text{-})_{\overline{573}}\text{-}O\text{-}(\text{-}CH_2CH_2CH_2CH_2\text{-})_{\overline{50}}\text{-}O\text{-}(\text{-}CH_2O\text{-})_{\overline{573}}H$<br>Mn = 38,800 | 1.8 | $2.9 \times 10^{-4}$ | 100/100 |
| Comparative Example 7 | $H\text{-}(\text{-}OCH_2\text{-})_{\overline{667}}\text{-}O\text{-}(\text{-}CH_2CH_2CH_2O\text{-})_{\overline{50}}\text{-}O\text{-}(\text{-}CH_2O\text{-})_{\overline{667}}H$<br>Mn = 43,000 | 2.0 | $0.8 \times 10^{-4}$ | 100/100 |
| Comparative Example 8 | $\text{-}(\text{-}CH_2\text{-}\underset{\underset{\underset{CH_3}{O}}{\underset{\|}{O}}}{\overset{CH_3}{\underset{\|}{C}}}\text{-})_{\overline{138}}\text{-}(\text{-}CH_2CH\text{-})_{\overline{30}}\text{-}$ with $C=O$, $O$, $C_2H_4$, $NH\text{-}(\text{-}CH_2O\text{-})_{\overline{74}}H$  Mn = 82,000 | 2.3 | $9.7 \times 10^{-2}$ | 48/100 |
| Comparative Example 9 | $\text{-}(\text{-}CH_2\text{-}\underset{\underset{\underset{iso\text{-}C_4H_9}{O}}{\underset{\|}{O}}}{\overset{CH_3}{\underset{\|}{C}}}\text{-})_{\overline{197}}\text{-}(\text{-}CH_2CH\text{-})_{\overline{15}}\text{-}$ with $C=O$, $O$, $C_2H_4$, $NH\text{-}(\text{-}CH_2O\text{-})_{\overline{124}}H$  Mn = 85,000 | 2.1 | $8.2 \times 10^{-2}$ | 51/100 |

TABLE 3

| Example | Polymer *note) | Vinyl monomer | Polyacetal resin composition | | Abrasion wear gr/km | Crosscut test |
|---|---|---|---|---|---|---|
| | | | Polyvinyl polymer | polyoxymethylene | | |
| 39 | Polyethyl acrylate (—COOH) | Ethyl acrylate | 5 | 0 | $1.1 \times 10^{-4}$ | 0/100 |
| 40 | Polyisobutyl methacrylate (—OH) | Isobutyl methacrylate | 30 | 0 | $2.1 \times 10^{-4}$ | 0/100 |
| 41 | Isobutyl methacrylate/methyl methacrylate copolymer (2-OH) | Isobutyl methacrylate Methyl methacrylate | 50 | 0 | $3.1 \times 10^{-4}$ | 0/100 |
| 42 | Methyl methacrylate/n-butyl acrylate copolymer (2-OH) | Methyl methacrylate n-butyl methacrylate | 200 | 0 | $2.8 \times 10^{-4}$ | 0/100 |
| 43 | 2-Ethylhexyl methacrylate/methyl methacrylate copolymer | 2-Ethylhexyl methacrylate Methyl methacrylate | 400 | 0 | $5.1 \times 10^{-4}$ | 0/100 |

TABLE 3-continued

| Example | Polymer (one-terminal functional group) | Vinyl monomer | Polyvinyl polymer | polyoxymethylene | Abrasion wear gr/km | Crosscut test |
|---|---|---|---|---|---|---|
| | (3-COOH) | | | | | |
| 44 | n-Stearyl methacrylate/ Styrene copolymer (2-OH) | N-Stearyl methacrylate Styrene | 500 | 0 | 8.8 × 10⁻⁴ | 0/100 |
| 45 | Poly-n-butyl acrylate (—OH) | n-Butyl acrylate Methyl methacrylate | 100 | 0 | 1.8 × 10⁻⁴ | 0/100 |
| 46 | Isobutyl methacrylate/ methyl methacrylate copolymer (2-OH) | Methyl methacrylate | 250 | 0 | 1.9 × 10⁻⁴ | 0/100 |
| 47 | n-Octyl methacrylate/ methyl methacrylate copolymer (2-COOH) | n-Octyl methacrylate | 300 | 0 | 3.2 × 10⁻⁴ | 0/100 |
| 48 | Polyisobutyl methacrylate copolymer (2-OH) | Iosbutyl methacrylate | 10 | 5 | 1.8 × 10⁻⁴ | 0/100 |

Note)
Functional group(s) in one terminal is in parenthesis. For example (—OH) means one —OH group, (2-OH) meand two —OH groups, and (3-OH) means three —OH groups. In the following Tables, the group(s) in parenthesis have the same meaning.

| Example | Polymer (one-terminal functional group) | Vinyl monomer | Polyacetal resin composition Polyvinyl polymer | polyoxymethylene | Abrasion wear gr/km | Crosscut test |
|---|---|---|---|---|---|---|
| 49 | Poly-n-butyl acrylate (2-OH) | n-Butyl acrylate Methyl methacrylate | 30 | 50 | 3.3 × 10⁻⁴ | 0/100 |
| 50 | Poly-iso-butyl methyacrylate (—OH) | Isobutyl methacrylate | 100 | 100 | 2.7 × 10⁻⁴ | 0/100 |
| 51 | Isobutyl methacrylate/ methyl methacrylate copolymer (2-NH₂) | Isobutyl methacrylate Methyl | 100 | 300 | 3.0 × 10⁻⁴ | 0/100 |
| 52 | Acrylonitrile/methyl acrylate copolymer (2-NH₂) | Acrylonitrile Methyl methacrylate | 100 | 500 | 2.7 × 10⁻⁴ | 3/100 |
| 53 | Vinyl chloride/methyl acrylate/methyl copolymer (—OH) | Vinyl chloride, methyl methacrylate, methyl methacrylate | 350 | 500 | 3.6 × 10⁻⁴ | 0/100 |
| 54 | Styrene/acrylonitrile copolymer (2-OH) | Styrene Acrylonitrile | 500 | 500 | 9.9 × 10⁻⁴ | 0/100 |
| 55 | Polyisobutyl methacrylate (2-OH) | Isobutyl methacrylate | 200 | 500 | 3.2 × 10⁻⁴ | 0/100 |
| 56 | Polyisobutyl methacrylate (2-OH) | Isobutyl methacrylate | 200 | 800 | 3.7 × 10⁻⁴ | 0/100 |
| 57 | Polyisobutyl methacrylate (2-OH) | Isobutyl methacrylate | 200 | 1100 | 2.9 × 10⁻⁴ | 2/100 |
| 58 | Polyisobutyl methacrylate (2-OH) | Isobutyl methacrylate | 200 | 1500 | 3.1 × 10⁻⁴ | 4/100 |
| 59 | n-Lauryl methacrylate/ methyl methacrylate copolymer (2-COOH) | n-Lauryl methacrylate methyl methacrylate | 100 | 200 | 1.9 × 10⁻⁴ | 0/100 |
| 60 | n-Lauryl methacrylate/ methyl methacrylate copolymer (2-COOH) | n-Lauryl methacrylate methyl methacrylate | 200 | 200 | 2.1 × 10⁻⁴ | 0/100 |
| 61 | n-Lauryl methacrylate/ methyl methacrylate copolymer (2-COOH) | n-Lauryl methacrylate methyl methacrylate | 300 | 200 | 4.9 × 10⁻⁴ | 0/100 |
| 62 | n-Lauryl methacrylate/ methyl methacrylate copolymer (2-COOH) | n-Lauryl methacrylate methyl methacrylate | 500 | 200 | 7.0 × 10⁻⁴ | 0/100 |
| 63 | Styrene/methyl methacrylate copolymer (3-OH) | Styrene Methyl methacrylate | 0 | 5 | 1.4 × 10⁻⁴ | 3/100 |
| 64 | Poly-n-propyl methacrylate (3-NH₂) | n-Propyl methacrylate | 0 | 50 | 1.6 × 10⁻⁴ | 0/100 |
| 65 | iso-Stearyl methacrylate/methyl methacrylate copolymer (—OH) | iso-Stearyl methacrylate methyl methacrylate | 0 | 200 | 1.1 × 10⁻⁴ | 0/100 |
| 66 | Acrylonitrile/vinyl chloride copolymer (2-COOH) | Acrylonitrile vinyl chloride | 0 | 500 | 0.9 × 10⁻⁴ | 1/100 |
| 67 | Ethyl methacrylate/ styrene copolymer (2-COOH) | Ethyl methacrylate styrene | 0 | 800 | 1.5 × 10⁻⁴ | 0/100 |
| 68 | Polymethyl methacrylate (—OH) | Methyl methacrylate | 0 | 1000 | 1.8 × 10⁻⁴ | 3/100 |
| 69 | n-Butyl methacrylate/ iso-butyl methacrylate copolymer (—OH) | n-Butyl methacrylate iso-butyl methacrylate | 0 | 1500 | 2.6 × 10⁻⁴ | 5/100 |
| 70 | n-Butyl methacrylate/ iso-butyl methacrylate | n-Butyl methacrylate iso- | 0 | 1650 | 2.7 × 10⁻⁴ | 11/100 |

TABLE 3-continued

|  | copolymer (—OH) | butyl methacrylate |  |  |  |  |
|---|---|---|---|---|---|---|
| Comparative Example 10 | — | — | — | — | $3.3 \times 10^{-4}$ | 100/100 |
| Comparative Example 11 | — | — | — | — | $2.1 \times 10^{-4}$ | 100/100 |
| Comparative Example 12 | — | — | — | — | $1.7 \times 10^{-4}$ | 100/100 |
| Comparative Example 13 | — | — | 300 | 1800 | $1.1 \times 10^{-4}$ | 31/100 |
| Comparative Example 14 | — | — | 0 | 1800 | $0.8 \times 10^{-4}$ | 82/100 |
| Comparative Example 15 | — | — | 650 | 0 | $9.8 \times 10^{-3}$ | 0/100 |
| Comparative Example 16 | — | — | 700 | 500 | $5.1 \times 10^{-3}$ | 0/100 |

INDUSTRIAL UTILITY

The polyacetal copolymer provided by this invention and the composition of this invention comprising the polyacetal copolymer and the specified other resins are engineering resins useful in a wide range of industrial fields such as in the automobile part field, etc., since they are not only excellent in physical properties such as mechanical strength and electrical properties but they are also excellent with respect to surface decorating properties such as printing and coating. The process for the production of the polyacetal copolymer, provided by this invention, gives the above excellent resins.

What is claimed is:

1. A polyacetal copolymer having a number average molecular weight of 10,000 to 500,000 of the formula

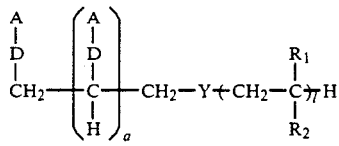

wherein
$R_1$ is hydrogen or alkyl;
$R_2$ is phenyl, cyano, chloro, acetyl or alkyl ester;
$l$ is 10 to 5,000;
A is polyoxymethylene;
D is

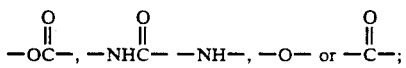

Y is oxygen or sulfur;
and $a$ is 0 to 3.

2. The polyacetal copolymer according to claim 1, wherein the vinyl group (B) is a residue of a poly (meth)acrylate ester.

3. The polyacetal copolymer according to claim 1, wherein the vinyl group (B) is a residue of a copolymer of an acrylate ester and a methacrylate ester.

4. The polyacetal copolymer according to claim 1, wherein the vinyl group (B) is a residue of a polystyrene.

5. The polyacetal copolymer according to claim 1, wherein the vinyl group (B) is a residue of a copolymer of styrene and an (meth)acrylate ester.

6. The polyacetal copolymer according to claim 1, wherein the oxyalkylene unit is an oxyethylene unit.

7. The polyacetal copolymer according to claim 1, wherein the oxyalkylene unit is an oxytetramethylene unit.

* * * * *